United States Patent [19]

Degnan

[11] Patent Number: 4,964,711
[45] Date of Patent: Oct. 23, 1990

[54] VIEWING DEVICE

[76] Inventor: Donald E. Degnan, 11 E. 47th St., New York, N.Y. 10017

[21] Appl. No.: 308,794

[22] Filed: Feb. 9, 1989

[51] Int. Cl.⁵ .......................... G02B 7/00; G02B 9/10; E06B 7/28

[52] U.S. Cl. ..................................... 350/574; 350/453; 49/171

[58] Field of Search ....................... 350/453, 574, 575; 220/82 A; 49/171; 34/88; 109/58.5

[56] References Cited

U.S. PATENT DOCUMENTS

| | | | |
|---|---|---|---|
| 2,638,810 | 5/1953 | Berleme | 350/575 |
| 3,910,676 | 10/1975 | Fojtik et al. | 350/575 |
| 3,973,835 | 8/1976 | Miyakawa et al. | 350/319 |
| 4,050,792 | 9/1977 | Svensson | 350/319 |
| 4,431,276 | 2/1984 | Weber | 350/574 |

FOREIGN PATENT DOCUMENTS

| | | | |
|---|---|---|---|
| 40580 | 7/1929 | Denmark | 49/171 |
| 1574813 | 9/1980 | United Kingdom | 49/171 |

Primary Examiner—Bruce Y. Arnold
Assistant Examiner—Ronald M. Kachmarik
Attorney, Agent, or Firm—J. B. Schafrann

[57] ABSTRACT

The present invention provides a viewing device, said device being positioned within the outer and inner surfaces of an entry door, to ascertain the identity of prospective entrants from within the confines of a dewlling. The device includes on the outer surface of the door a turret wherein at least four ports retain a like series of wide angles lenses. One of said ports and its lens is situated axially along a line from the eyepiece for straight ahead viewing, while the three ports and complimentary lenses are situated radially at right angles in relation to said axial port so as to give complete views of the area below and to the right and left of the doorway. A mirror, being positioned by a cam means, transmits the light and hence the image from each port to the user within the dwelling. By repositioning the mirror, the user may ascertain the presence and identity of visitors within a complete one hundred eighty degree field before the door.

4 Claims, 2 Drawing Sheets

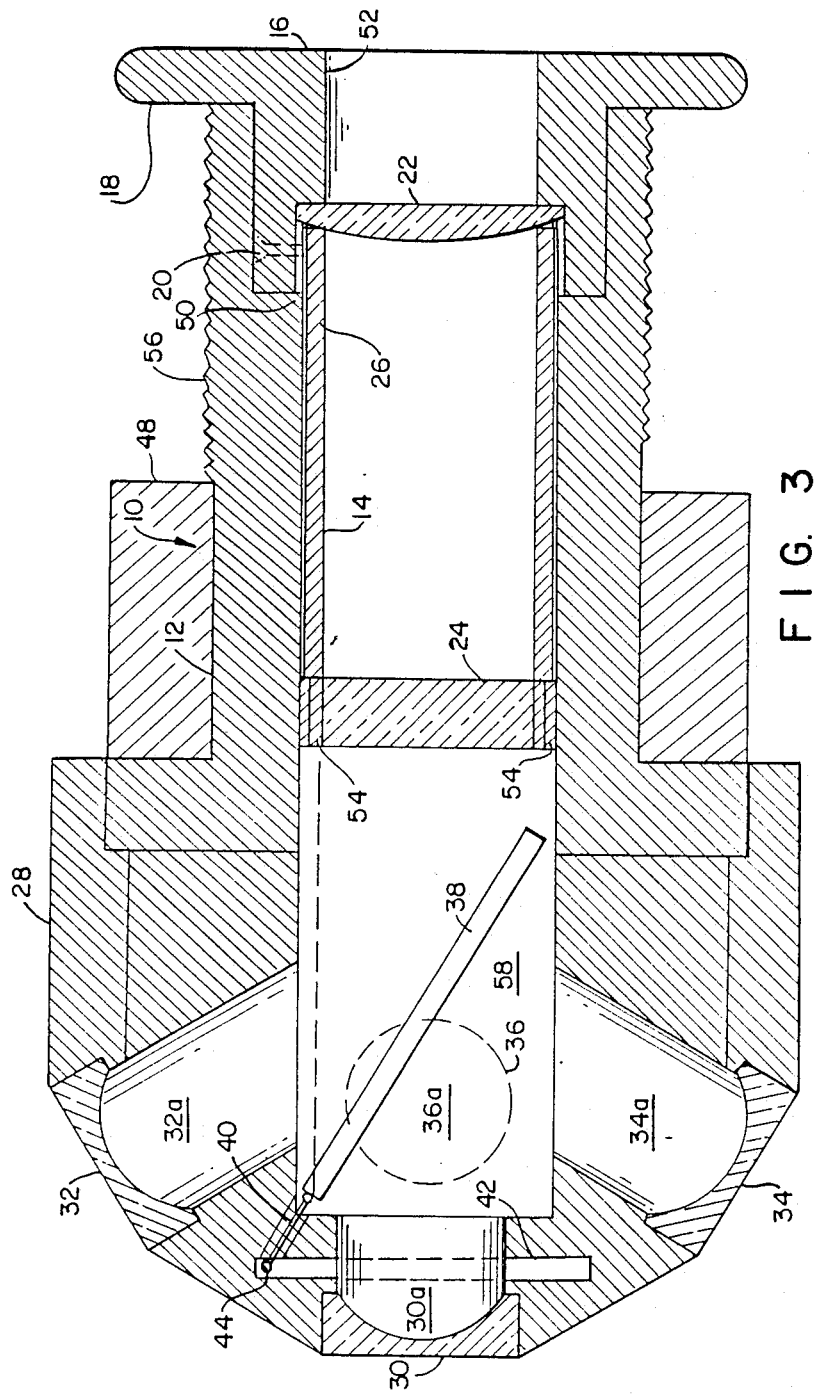

VIEWING DEVICE

FIELD OF THE INVENTION

The present invention generally relates to a peephole device, and more specifically to a viewing device for ascertaining the presence of persons seeking admission to a dwelling.

BACKGROUND OF THE INVENTION

With the constantly accelerating crime rate and the inherent ingenuity of the criminal, citizens have employed many devices to augment their ability to identify a caller. For centuries peepholes of one sort or another have served to assist a dwelling's occupant in identifying potential entrants. The traditional peephole has been refined over the years. Refinements include the use of ultra-wide angle "fish-eye" lenses to enhance the field of view and various camouflages, like one-way glass, to conceal the observer within.

The urban apartment house in particular presents peculiar security problems. Not only may ambient hallway lighting be inadequate, but also irregularly-shaped hallways make ideal hiding places for persons seeking to avoid detection. If a perpetrator premeditatedly reduces visibility, most available viewing devices will simply fail to function, exposing the user to the difficult choice of opening the door to an intruder or preventing the entrance of a friend.

U.S. Pat. No. 3,973,835 issued to Miyakawa et al discloses a periscope device which includes a fixed one-way mirror. The viewer looks through the one-way mirror to achieve an axial view and by positioning the radial lens in the radial port accomplishes radial viewing. The fixed mirror acts as a filter and decreases the amount of available light reaching the eyepiece.

U.S. Pat. No. 4,050,792 issued to Svensson discloses a viewing device which is comprised of a housing and three separate viewing elements which afford a panoramic view. The field of view is inherently limited by the placement of the individual viewing elements, making right-angle viewing unobtainable. Moreover, the separate viewing elements require the viewer to align his line of sight through three separate apertures. Finally, the construction of the device would encourage the spread of fire. The mounting hole, cut through the door, could act as a sizable chimney drawing flames therethrough.

SUMMARY OF THE INVENTION

The viewing device in accordance with the present invention is adapted to be positioned within the outer and inner surfaces of an entry door. The device is comprised of a turret, housing a plurality of lenses. One lens faces forward or axially, and the others face at right angles radially in relation to the forward facing axial lens, to the left, right and downward. Secured to the turret is a connecting tube which overlays an inner tube. In communication with the turret is an inner tube containing a lens, and terminating in a eyepiece assembly. The inner tube is surrounded by the connecting tube, allowing the inner tube to rotate therein. A swingingly positionable mirror is retained within a mirror retaining chamber, said chamber being formed by the union of the inner tube and the turret. The eyepiece is adapted to be used by a person within the dwelling to position the swingingly mounted mirror. The mirror is positioned at an angle of inclination to the radial viewing ports by using a cam-type positioning device, which reversibly allows the user to view through the ultra-wide angled lenses axially and then radially. By utilizing the right angle viewing capabilities of the present invention persons cannot secret themselves to the side or below the line of sight.

The device is constructed to impede the spread of fire. The turret, housing the plurality of lenses, is designed to fall outwardly and away from the door leaving the inner tube and a lens of pyrometer-type glass to prevent the entry of the flames.

Therefore, a viewing device constructed in accordance with the present invention is illustrated in the accompanying drawings in which:

BRIEF DESCRIPTION OF THE DRAWINGS

FIG. 3 is a top plan view of the same.

DETAILED DESCRIPTION

Figure 1:
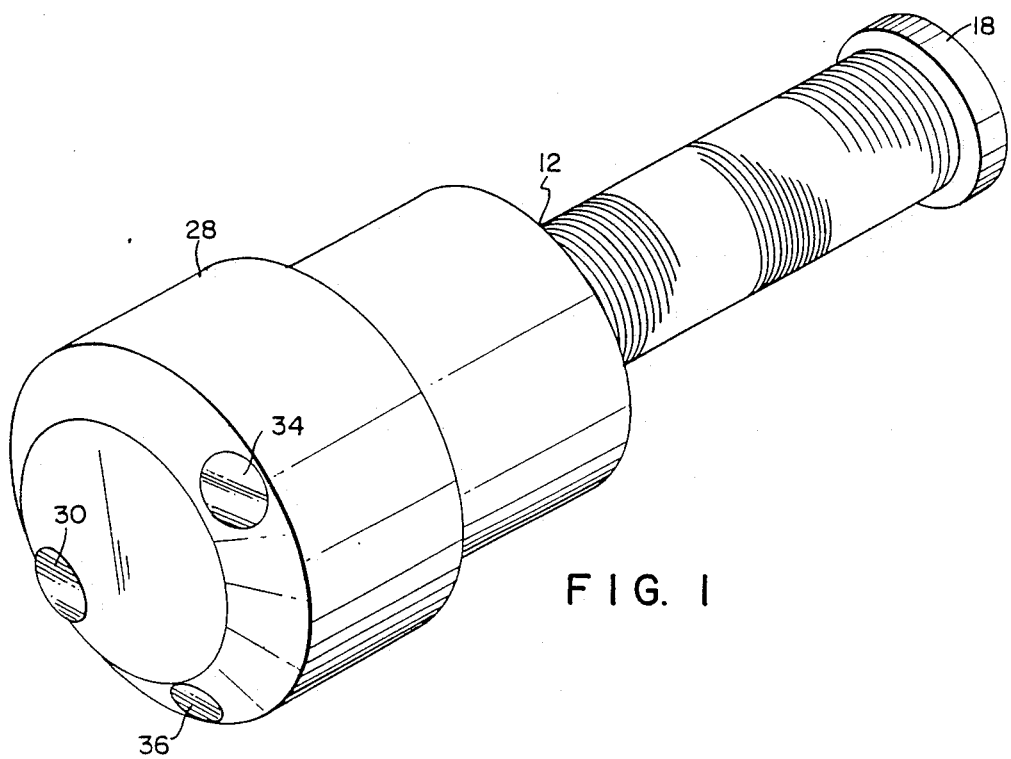
FIG. 1 is an elevational view in perspective of the viewing device.

Referring with more specificity to the drawings wherein like numerals depict like parts throughout, FIG. 3 shows the preferred embodiment of viewing device 10. Viewing device 10, as shown in an assembled condition in FIG. 1, is designed to be secured between the outer and inner surfaces of an entry door, and is disposed therethrough so that turret 28 is on the outer surface of the door and eyepiece 16 resides within the inner surface of the door. After positioning device 10 within a hole cut through an entry-door, installation may be effected by using a locking means such as a collar or locking nut (not shown), which in one embodiment is threadedly secured over threaded area 56 of connecting tube 12. Reduced area 48 of turret 28 terminates in shoulder 46, said shoulder acting as a locking surface to allow the device to be secured within a door. Once secured, turret 28 remains in a fixed position.

Figure 2:
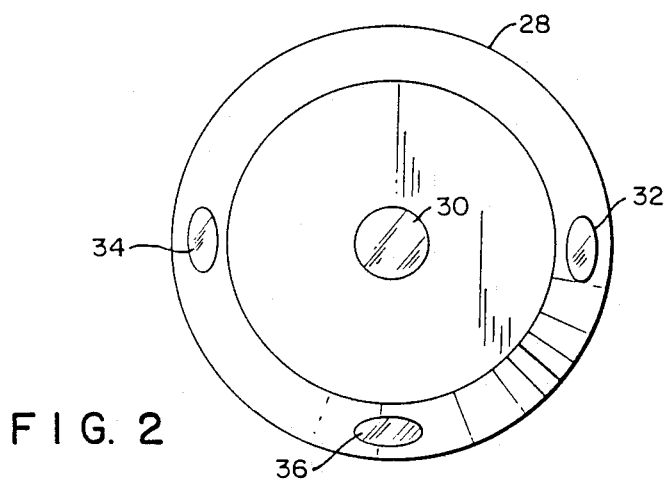
FIG. 2 is a front elevational view of thereof.

In the preferred embodiment of FIG. 1, turret 28 is essentially dome-shaped and provides a housing wherein a plurality of ports 30a, 32a, 34a, and 36a are adapted to receive a plurality of lenses 30, 32, 34, and 36. Turret 28 along with lenses 30, 32, 34, and 36 are held immobile. Port 30a and lens 30 faces axially in relation to eyepiece lens 22. Lenses 30–36 are preferably spherically-concave, that is a lens having a concave side and directly opposite therefrom a spherical side. While the spherical-shaped lens is preferable, most extreme wide angle lenses may be operatively substituted. For purposes of the present invention the term wide angle lens means a lens wherein the field of view is at least 50 degrees from one side of the field to the other. Lenses 30–36 are approximately 69 diopters, have a focal length of from 14 to 15 millimeters, are 6.88 millimeters thick, are spherically-concave in shape and may be fashioned from glass, plastic or other vitreous material. In accordance with FIG. 2, lenses 32, 34, 36 are situated radially and at right angles to the left, right, and downwardly in relation to axial lens 30. As a result all exterior views are covered. In fact, if practicable another lens could be added to complete a three hundred sixty degree hemispherical field of view. The instant invention unlike the prior art allows for true right angle viewing, a field of view which exceeds any device heretofore available. Furthermore, the spherically-shaped rear surface of the lenses used herein frustrates attempts by intruders to sight rearward into the dwelling. The spherical surfaces cooperatively reduce the image of the interior to a pinpoint.

Connecting tube 12 is secured to turret 28 on one end and abuts a shoulder formed by bezel 18 of eyepiece 16 on the other. Connecting tube 12 overlays inner tube 14 and as stated above is positioned through the door cavity. Connecting tube 12 further possesses reduced area 46, shoulder 48, and threaded area 56 affording a series of cooperative mounting surfaces.

Inner tube 14 is comprised of a cylindrical-shaped tube 26, preferably fashioned from steel or other like metallic fire-resistant material. Said tube 14 provides retaining ring 54 for lens 24, said lens being preferably fashioned from pyrometer glass, said glass being formed from a pyrex-glass or quartz material and being able to withstand in excess of 1900 degrees Farenheit. The vitreous material must permit the transmission of at least ninety-eight percent of the light traveling therethrough.

Inner tube 14 is free to rotate three hundred and sixty degrees (360 degrees) using the inner surface of connecting tube 12 as a bearing surface. Connecting tube 12 provides an annular chamber to retain inner tube 14 and eyepiece 16. Eyepiece 16 along with bezel 18 are retained in position by annular shoulder 50 of connecting tube 12. Eyepiece 16, is secured to inner tube 14 by way of fasteners or may be of an integral design. Eyepiece 16 is further designed to include bezel 18 and lens 22. Lens 22 magnifies the image which is transported by mirror 38, said lens preferably having a focal length of approximately 100 millimeters and of approximately 10 diopters. Lens 22 is preferably spherically convex in shape. Bezel 18 is adapted for manual rotation. Rotation of bezel 18 causes radial rotation of inner tube 14. Eyepiece 16 and inner tube 14 cooperate to retain eyepiece lens 22 within viewing port 52. Eyepiece lens 22 is designed to magnify the image that is reflected rearward from any one of the plurality of lenses and from mirror 38. The interior of inner tube 14 may be blackened to reduce glare and intensify the image transported back to the viewer.

A mirror is hingedly mounted within turret 28, and retained by inner tube 14 on one end and turret 28 on the other forming thereby mirror retaining chamber 58. Within mirror retaining chamber 58, mirror 38 is free to move and to be positioned therein. Models in accordance with the prior art, require the viewer to look through a stationary mirror. In the present invention the swingingly positionable mounted mirror can retracted. The mirror may be as densely-silvered as possible to transmit the maximum amount of light rearward since axial viewing is effected when the mirror is in the retracted position.

*Unlike the prior art, wherein the viewer looks through a stationary mirror no loss of visibility occurs.

In the instant invention, mirror 38 is in hingedly communicates by hinge 44 with turret 28 and is swingingly positioned between extended and retracted positions as shown in FIG. 3. When retracted, as shown by dotted lines, mirror 38 is swung out of the viewing range. When extended, FIG. 2 the mirror acts as a reflector of light that enters through radial viewing lens 32-36.

Mirror 38 is moved into position by an actuator means. The preferred embodiment for an actuator means is a camming means comprised of cam 42 and cam follower 40. Simply, the cam and cam follower are designed to extend and retract mirror 38 so that mirror 38 ca be positioned directly before each port.

Light travels through one of the following lenses 32, 34 or 36 and contacts mirror 38. Said mirror is inclined at and angle of essentially 30 degrees relative to the axis of inner tube 14 and eyepiece 16, so that the light rays pass radially through the chosen viewing port. Transported rearward, the rays are reflected through approximately 90 degrees and travel axially towards eye piece 16 and therethrough to observer's eye. The image captured by mirror 38 is magnified by lens 22 of eyepiece 16. Lens 22 is held immovably within an annular chamber defined with eyepiece 16.

When a person wishes to view the area directly in front of the entry door, mirror 38 is in the withdrawn or retracted position, as shown by dotted lines in FIG. 3. In this unoccluded condition a viewer looks through eye piece 16 and therethrough to axial lens 30 directly ahead at a caller standing in front of the door.

EXAMPLE

The device in accordance with the instant invention is constructed as follows. Through an aperture of cut through a door, of about 50 millimeters in diameter, the device is placed so that the turret composed of injection molded poly-carbonate, is on the outer surface. The turret has at least four ports, holding a like number of lenses, and face axially and radially so that views to the right, left and downward are covered. The lenses disposed in said ports are preferably approximately 14.34 millimeters, 69.73 diopters, 14.75 millimeters in thickness, and are spherically-concave. The turret is approximately 60.325 millimeters in diameter. A connecting tube constructed from 17 gauge (1.47 millimeters thick) cold rolled steel is threadedly secured to the turret by a standard thread size like seven-eighths by thirty two size. With the connecting tube an inner tube fashioned from 16 gauge (1.58 millimeters thick) cold rolled steel is disposed, said tube being able to rotate 360 degrees, using the connecting tube as a bearing surface. The connecting tube is dimensionally identical in diameter to the hole cut through the door. Locking the device immovably within the hole is effected by a locking means such as a threaded nut adapted to be received by the threaded area of the connecting tube. The mirror retaining, chamber formed by the union of the inner tube and turret, defines an area within which the mirror moves. Fashioned from glass or an acrylic thermoplastic polymer, the mirror is free to be swingingly positioned in inclined relation to each port. The angle of inclination is from about 20 degrees to about 40 degrees with about 30 degrees relative to the longitudinal axis of said inner tube being preferable. The inner tube, fashioned from 16 gauge cold rolled steel immovably retains a lens of pyrometer glass. Said lens being preferably 19 millimeters in diameter, prevents flames from flowing therethrough. The inner tube terminates in an eyepiece assembly, said assembly possessing a bezel for rotational movement. The inner tube is held within the connecting tube, and uses the connecting tube to rotate within. Rotating the inner tube actuates a camming device which in turn positions the mirror in extended or retracted conditions before each lens. A magnifying eyepiece lens with a focal length of preferably 100 millimeters and 10 diopters transmits the image to the viewer.

It may be however, that having failed to detect the presence of a caller directly in front of the entry door, the user wishes to scan the remaining area. If the caller has secreted himself on either side of the door, or below the line of sight and out of the normal panoramic field of vision the observer merely manipulates device 10 as follows. The viewer grasps bezel 18 of eyepiece 16, and by turning rotatable bezel 18, actuates cam follower 40 of cam 42 which is connected via hinge 44 to mirror 38. Mirror 38 which heretofore had been swingingly retained in a retracted position is now extended in condition for positioning. As stated above, within turret 28 there are at least three radial lens. When mirror 38 is positioned in an extended condition it is commensurately positioned to align with one of the radial lenses.

Mirror 38 is free to move as it is driven or positioned by cam follower 40. Cam 42 is an integral part of turret 28. Cam follower 40 travels within and around cam 42. Cam 42 is shaped to be analogous with the settings or positions of mirror 38 and hence lenses 32, 34 and 36. Rotation of bezel 18 of eye piece 16 either clockwise of counter-clockwise rotates inner tube 14 which in turn positions mirror 38 at an angle of incidence commensurate with the lens to be used. As inner tube 14 is rotated, cam follower 40 follows the groove of the cam 42 continually positioning mirror 38. Further rotation of inner tube 14 continues to change the position of the mirror 38, as cam follower 40 travels around the cam 42 continuously repositioning the mirror 38 to a position analogous to the configuration of cam 42 until mirror 38 is once again brought to a retracted position.

Unlike existing devices the present invention is inherently fire resistant. Device 10 is designed so that turret 28, constructed from a more labile material, like a rigid thermoplastic polymer, will fall outside of the door when turret 28 is exposed to the intense heat of a fire for a prolonged period of time. Inner tube 14 as well as connecting tube 12 may be preferentially fashioned from steel or other fire-resistant material, said parts cooperatively forming a fire-resistant bushing to protect the inner core of the door itself from flame. As mentioned hereinabove, inner tube 14 contains a lens 24, fashioned of pyrometer-type glass to block the pathway of invading flames or burning debri. The instant device unlike traditional prior art peephole devices protects the dwelling from fire entering the room via the hole cut for installation of the device.

In addition to the above mentioned advantages, the use of a swingingly positionable mirror provides a three-fold advantage. First, by being able to move the mirror out of the line of sight, overall light intensity and transmission is increased. Second, in the extended position, an opaque mirror may be used so that light transmitted rearward may be reflected from the most densely-silvered mirror possible. It should be noted that devices in accordance with the prior art, utilizing stationary one-way mirrors, prevents maximum amounts of light from reaching the eye piece, since the light is filteredly reduced therethrough. Third, the swingingly retained lens obviates the parallax problem encountered when using a fixed mirror system. Briefly the parallax problem is that when one uses a fixed one-way mirror, the reflected image, albeit faint, from the radial viewing port is seen by the viewer along with the transmitted image via the same port.

The above described embodiment is the preferred embodiment, but one skilled in the art will appreciate that other modifications, such as the angle of the mirror with respect to the viewing axis or the number of ports and complimentary lenses, fall within the spirit and scope of the claims that follow.

What is claimed is:

1. A viewing device comprising:
   a. a turret at one end, said turret forming a housing to accommodate a plurality of ports within which a like number of lenses are immovably disposed;
   b. a connecting tube, secured to said turret on the one end and providing a continuation of said housing for;
   c. an axially extending inner tube rotatably mounted within said connecting tube, said inner tube terminating in an axially facing eyepiece and eyepiece lens at the other end,
   d. a mirror swingingly mounted within a mirror retaining chamber, said chamber being created by the communication of said turret and said inner tube; and
   e. a cam and a cam follower, said cam follower circumscribing a path within said cam, to position said mirror between extended and retracted conditions, and positioning said mirror within said turret so that said mirror, when extended, is analogous to and in inclined relation to said radially facing viewing ports and lens, to reflect rays entering radially through said radially facing viewing ports, and when retracted transmitting light unimpededly therethrough in an axial direction to said eyepiece.

2. A viewing device as set forth in claim 1 wherein said mirror is disposed at an angle of from about 20 degrees to 40 degrees relative to the longitudinal axis of said inner tube.

3. A viewing device as set forth in claim 1 plurality of ports wherein a like number of lenses are retained as described in claim 1 wherein said ports and lenses are retained at right angles to the right, left and downward relative to an axial port.

4. An inner tube as described in claim 1 further comprising a steel cylinder and a lens of pyrometer glass.

* * * * *